(12) United States Patent
Jones et al.

(10) Patent No.: US 8,091,310 B2
(45) Date of Patent: Jan. 10, 2012

(54) SHEET-LIKE BUILDING AND CONSTRUCTION MATERIALS WITH HIGH WET SLIP RESISTANCE AND HIGH WATER PENETRATION RESISTANCE, AND METHODS OF MAKING SAME

(75) Inventors: Gregory K. Jones, Lebanon, OH (US); Nicole A. Gerwe, Cincinnati, OH (US); Christopher D. Faust, Loveland, OH (US); David G. Bland, Mason, OH (US)

(73) Assignee: Clopay Plastic Products Company, Inc., Mason, OH (US)

( * ) Notice: Subject to any disclaimer, the term of this patent is extended or adjusted under 35 U.S.C. 154(b) by 724 days.

(21) Appl. No.: 11/970,148

(22) Filed: Jan. 7, 2008

(65) Prior Publication Data

US 2008/0166533 A1      Jul. 10, 2008

Related U.S. Application Data

(60) Provisional application No. 60/879,510, filed on Jan. 9, 2007.

(51) Int. Cl.
*E04D 1/10* (2006.01)
(52) U.S. Cl. .............. 52/408; 52/177; 52/181; 428/212; 428/105; 156/71; 156/94; 442/181; 442/282
(58) Field of Classification Search .................... 52/408; 442/181, 282; 156/71, 94; 428/105
See application file for complete search history.

(56) References Cited

U.S. PATENT DOCUMENTS 4,992,315 A * 2/1991 Zickell et al. ................ 428/40.3
(Continued)

FOREIGN PATENT DOCUMENTS

DE         2951266 A1      6/1981
(Continued)

OTHER PUBLICATIONS

International Search Report and Written Opinion, mailed Jun. 7, 2009, PCT/US2008/000283.

*Primary Examiner* — Angela Ortiz
*Assistant Examiner* — Michael Nelson
(74) *Attorney, Agent, or Firm* — Wood, Herron & Evans, LLP (57) ABSTRACT

Moisture-resistant materials comprise an open net-like fabric with strands of varying thicknesses and polymer film thereon. The material is both resistant to water penetration and also slip resistant under dry or wet conditions. The moisture-resistant materials are suitable for use in various applications including roofing underpayment, flashing, housewrap and other construction sheet-like materials. An optional second layer of fabric may be applied to the moisture-resistant material, for example, to improve the strength, tear resistance, and scuff resistance of the moisture-resistant material.

53 Claims, 7 Drawing Sheets

U.S. PATENT DOCUMENTS

| | | | |
|---|---|---|---|
| 5,687,517 A * | 11/1997 | Wiercinski et al. | 52/177 |
| 5,787,655 A * | 8/1998 | Saylor, Jr. | 52/181 |
| 5,865,926 A | 2/1999 | Wu et al. | |
| 6,147,018 A | 11/2000 | Chiou | |
| 6,192,650 B1 * | 2/2001 | Kittson et al. | 52/741.4 |
| 6,296,912 B1 * | 10/2001 | Zickell | 428/40.1 |
| 6,308,482 B1 * | 10/2001 | Strait | 52/408 |
| 6,378,259 B1 * | 4/2002 | Carlson | 52/408 |
| 6,427,395 B1 * | 8/2002 | Elsasser et al. | 52/181 |
| 6,454,889 B1 * | 9/2002 | Hendrix et al. | 156/71 |
| 6,524,980 B1 * | 2/2003 | Fensel et al. | 442/181 |
| 2001/0046575 A1 | 11/2001 | van Weperen et al. | |
| 2003/0040691 A1 | 2/2003 | Griesbach, III et al. | |
| 2003/0201573 A1 * | 10/2003 | Cabrey | 264/276 |
| 2004/0148887 A1 * | 8/2004 | Di Pede | 52/408 |
| 2005/0020168 A1 * | 1/2005 | Pott | 442/268 |

FOREIGN PATENT DOCUMENTS

EP 0585002 A 3/1994

\* cited by examiner

SHEET-LIKE BUILDING AND CONSTRUCTION MATERIALS WITH HIGH WET SLIP RESISTANCE AND HIGH WATER PENETRATION RESISTANCE, AND METHODS OF MAKING SAME

RELATED APPLICATION

This application claims priority under 35 U.S.C. §119 of U.S. Application Ser. No. 60/879,510 filed Jan. 9, 2007.

FIELD OF THE INVENTION

The present invention is directed to moisture-resistant sheet-like materials comprising fabric layers coated with polymeric film. These materials are suitable for use, for example, as building and construction materials, such as flooring underpayment, roofing underpayment, and flashing. The present invention is also directed to methods for making such moisture-resistant materials.

BACKGROUND OF THE INVENTION

The building and construction (B&C) industry uses fabrics, polymer films, and other such sheet-like materials extensively to cushion, insulate, seal, or protect the various components of a building as it is being constructed. Examples of these sheet-like materials include housewrap, lumber wrap, roof underpayment, flashing, etc. These materials should be tough and strong to withstand the rigors of the building process. These materials often need to be water repellant, to protect the interior of the building from moisture damage. It may be desirable to have these sheet-like materials be breathable, in order to allow water vapor generated in the building to escape rather than remaining inside the building and causing moisture damage, mold growth, and other associated problems. These building materials may also play a role in insulating the building. Finally, of course, it is desirable to have the materials available at a reasonable cost.

Roofing underpayment is a sheet-like material secured to the framing of the roof to provide a protective barrier before the final roofing materials (shingles, tiles, etc.) are installed. Roofing underpayment should be sufficiently impermeable to air and liquids to protect the interior of the house from wind, rain or other precipitation during construction. On the other hand, it may be desirable to have roofing underpayment that is breathable, which will allow water vapor to escape through the roofing underpayment to prevent such problems as water damage, the growth of molds, or the like. Further, roofing underpayment should have adequate tensile and physical properties such as break strength, elongation, tear strength, shrink resistance, and puncture strength to avoid damage during installation and to facilitate durability.

There are two typical methods of constructing roofs in the United States. In one method, a deck of plywood is laid down over the rafters, the roofing underpayment is placed over the deck, and the final roofing materials, such as shingles, are installed over the underpayment. In the other method, no deck is laid down over the rafters; rather, the roofing underpayment itself must be able to support the weight of the roofing material and the roofer who is installing the roof.

Traditionally, an asphalted felt material has been used for roofing underpayment. This material has the advantage of being waterproof. Asphalted felt has acceptable tensile and tear strength, but is known to be prone to tearing during high-wind weather conditions. Unfortunately, asphalted felt ages with heat and tends to pick up moisture, both of which result in the asphalted felt degrading over time. Asphalted felt is also very heavy and hence very difficult to lift onto a roof. Thus, the underpayment must be installed in multiple 'patches' because the weight of the material limits the size of roofing underpayment rolls.

Recently, underpayment comprising polymer films laminated to fabrics or scrims has been introduced to the market. These materials are substantially lighter than the asphalted felt materials, and hence are easier and more convenient to maneuver and install. However, these materials tend to be slippery, especially when they are wet, which creates a slip hazard for the roofer who is doing the installation.

Accordingly, a need exists for improved moisture-resistant materials for B&C applications which are light, easy to install, and with improved wet slip resistance.

SUMMARY OF THE INVENTION

It is therefore an object of the invention to provide novel moisture-resistant materials which overcome various disadvantages of the prior art, and which are particularly suitable for use in applications requiring high wet slip resistance, such as B&C applications. It is an additional object to provide novel methods for making such moisture-resistant materials.

These and additional objects are provided according to the present invention. In one embodiment, the invention is directed to moisture-resistant materials. The moisture-resistant materials comprise a layer of open net-like fabric with strands of varying thickness and a layer of moisture-resistant polymer film thereon. The moisture-resistant material may also comprise an optional third layer of material, such as nonwoven or woven fabric, netting, scrim, or woven tape material, which provides additional strength and tear resistance to the inventive moisture-resistant material.

In another embodiment, the invention is directed to moisture-resistant B&C materials. The moisture-resistant B&C materials comprise a layer of open net-like fabric with strands of varying thickness and a layer of impervious polymer film.

In another embodiment, the invention is directed to moisture-resistant B&C materials. The moisture-resistant B&C materials comprise a layer of open net-like fabric with strands of varying thickness and a layer of breathable polymer film comprising a polymer composition that permits the passage of water vapor.

In another embodiment, the invention is directed to moisture-resistant B&C materials. The moisture-resistant B&C materials comprise a layer of open net-like fabric with strands of varying thickness and a layer of microporous breathable polymer film comprising a polymer composition that permits the passage of water vapor.

In another embodiment, the invention is directed to moisture-resistant B&C materials. The moisture-resistant B&C materials comprise a layer of open net-like fabric with strands of varying thickness, a layer of impervious polymer film, and a second layer of fabric.

In another embodiment, the invention is directed to moisture-resistant B&C materials. The moisture-resistant B&C materials comprise a layer of open net-like fabric with strands of varying thickness, a layer of breathable polymer film comprising a polymer composition that permits the passage of water vapor, and a second layer of fabric.

In another embodiment, the invention is directed to moisture-resistant B&C materials. The moisture-resistant B&C materials comprise a layer of open net-like fabric with strands of varying thickness, a layer of microporous breathable polymer film comprising a polymer composition that permits the passage of water vapor, and a second layer of fabric.

In yet another embodiment, the invention is directed to methods of making a moisture-resistant material. The methods comprise extrusion coating a layer of moisture-resistant polymer film onto a layer of open net-like fabric with strands of varying thicknesses.

In yet another embodiment, the invention is directed to methods of making a moisture-resistant material. The methods comprise extrusion coating a layer of breathable polymer film comprising a polymer composition that permits the passage of water vapor onto a layer of open net-like fabric with strands of varying thicknesses.

In yet another embodiment, the invention is directed to methods of making a moisture-resistant material. The methods comprise extrusion coating a layer of microporous-formable polymer film comprising a polymer composition and a filler onto a layer of open net-like fabric with strands of varying thicknesses.

In yet another embodiment, the invention is directed to methods of making a moisture-resistant material. The methods comprise extrusion coating a layer of moisture-resistant polymer film simultaneously onto and between a first layer of open net-like fabric with strands of varying thicknesses and a second layer of fabric.

In yet another embodiment, the invention is directed to methods of making a moisture-resistant material. The methods comprise extrusion coating a layer of breathable polymer film comprising a polymer composition that permits the passage of water vapor simultaneously onto and between a first layer of open net-like fabric with strands of varying thicknesses and a second layer of fabric.

In yet another embodiment, the invention is directed to methods of making a moisture-resistant material. The methods comprise extrusion coating a layer of microporous-formable polymer film comprising a polymer composition and a filler simultaneously onto and between a first layer of open net-like fabric with strands of varying thicknesses and a second layer of fabric.

In yet another embodiment, the invention is directed to methods of making a moisture-resistant material. The methods comprise extrusion coating a layer of moisture-resistant polymer film onto a first layer of open net-like fabric with strands of varying thicknesses. A second layer of fabric is then bonded to the other surface of the polymer film layer by known methods, such as adhesive, thermal, or ultrasonic bonding.

In yet another embodiment, the invention is directed to methods of making a moisture-resistant material. The methods comprise extrusion coating a layer of breathable polymer film comprising a polymer composition that permits the passage of water vapor onto a first layer of open net-like fabric with strands of varying thicknesses. A second layer of fabric is then bonded to the other surface of the polymer film layer by known methods, such as adhesive, thermal, or ultrasonic bonding.

In yet another embodiment, the invention is directed to methods of making a moisture-resistant material. The methods comprise extrusion coating a layer of microporous-formable polymer film comprising a polymer composition and a filler onto a first layer of open net-like fabric with strands of varying thicknesses. A second layer of fabric is then bonded to the other surface of the polymer film layer by known methods, such as adhesive, thermal, or ultrasonic bonding.

In yet another embodiment, the invention is directed to methods of making a moisture-resistant material. The methods comprise bonding a layer of moisture-resistant polymer film onto a first layer of open net-like fabric with strands of varying thicknesses by known bonding methods, such as adhesive, thermal, or ultrasonic bonding. An optional second layer of fabric may be bonded to the other surface of the polymer film layer or the open net-like fabric by known methods, such as adhesive, thermal, or ultrasonic bonding.

In yet another embodiment, the invention is directed to methods of making a moisture-resistant material. The methods comprise bonding a layer of breathable polymer film onto a first layer of open net-like fabric with strands of varying thicknesses by known bonding methods, such as adhesive, thermal, or ultrasonic bonding. An optional second layer of fabric may be bonded to the other surface of the polymer film layer or the open net-like fabric by known methods, such as adhesive, thermal, or ultrasonic bonding.

In yet another embodiment, the invention is directed to methods of making a moisture-resistant material. The methods comprise bonding a layer of moisture-resistant microporous-formable or microporous polymer film onto a first layer of open net-like fabric with strands of varying thicknesses by known bonding methods, such as adhesive, thermal, or ultrasonic bonding. An optional second layer of fabric may be bonded to the other surface of the polymer film layer or the open net-like fabric by known methods, such as adhesive, thermal, or ultrasonic bonding.

The moisture-resistant materials according to the invention are advantageous in that they exhibit a desirable combination of strength, liquid impermeability, and high wet slip resistance, and may be easily manufactured by the methods of the invention. These and additional objects and advantages provided by the moisture-resistant materials and methods of the invention will be more fully apparent in view of the following detailed description.

DETAILED DESCRIPTION

The present invention is directed to moisture-resistant materials for use in various applications. In one embodiment, the moisture-resistant materials are suitable for use as B&C materials, including but not limited to roofing underpayment, flashing, housewrap, or other construction applications. However, one skilled in the art will recognize from the present description other specific applications and uses of the moisture-resistant materials which are within the scope of the invention.

For the purpose of this disclosure, the following terms are defined:

"Film" refers to material in a sheet-like form where the dimensions of the material in the x (length) and y (width) directions are substantially larger than the dimension in the z (thickness) direction. Films have a z-direction thickness in the range of about 1 µm to about 1 mm.

"Strands" refer to fibers, threads, tapes, or other string-like materials.

"Thick strands" refer to strands that have a diameter of at least about 10 mil (0.25 mm).

"Thin strands" refer to strands that have a diameter that is no larger than 90% of the diameter of the thick strands.

"Net-like fabric" refers to materials comprising at least two pluralities of strands. The first plurality of strands are laid roughly parallel to one another in a layer in a first direction, and the second plurality of strands are laid roughly parallel to one another in a layer in a second direction that is at an angle to the first direction. The second plurality of strands are typically oriented at an angle between about 15° and 165°, preferably at an angle between about 45° and 135°, relative to the first plurality of strands. Additional pluralities of strands may also be laid roughly parallel to one another in layers in additional directions that are at angles to the first and second directions. The layered strands are affixed to one another by known processes, such as weaving the strands, bonding the strands at crossover points, tying the strands, or other known means.

"Open, net-like fabric" refers to a net-like fabric where the pluralities of strands are laid in a spaced-apart manner such that there are open areas visible to the naked eye between the strands.

"Laminate" as a noun refers to a layered structure of sheet-like materials stacked and bonded so that the layers are substantially coextensive across the width of the narrowest sheet of material. The layers may comprise films, fabrics, or other materials in sheet form, or combinations thereof. For instance, a laminate may be a structure comprising a layer of film and a layer of fabric bonded together across their width such that the two layers remain bonded as a single sheet under normal use. A laminate may also be called a composite or a coated material. "Laminate" as a verb refers to the process by which such a layered structure is formed.

"Coextrusion" refers to a process of making multilayer polymer films. When a multilayer polymer film is made by a coextrusion process, each polymer or polymer blend comprising a layer of the film is melted by itself. The molten polymers may be layered inside the extrusion die, and the layers of molten polymer films are extruded from the die essentially simultaneously. In coextruded polymer films, the individual layers of the film are bonded together but remain essentially unmixed and distinct as layers within the film. This is contrasted with blended multicomponent films, where the polymer components are mixed to make an essentially homogeneous blend or heterogeneous mixture of polymers that are extruded in a single layer.

"Extrusion lamination" or "extrusion coating" refer to processes by which a film of molten polymer is extruded onto a solid substrate, in order to coat the substrate with the polymer film and to bond the substrate and film together.

"Film strength" or "mechanical strength" are the tensile properties of a film, as measured by ASTM D-822 "Tensile Properties of Thin Plastic Sheeting." Unless noted otherwise, "film strength" or "mechanical strength" refers specifically to tensile at break and % elongation at break.

"Tear strength" is a property of a film which determines the ease or difficulty by which the film can be torn starting from a notch or aperture cut into the film.

"Bond strength" is a property of a laminate comprising two or more layers. The bond strength is determined by measuring the force required to peel apart the laminate layers after they are bonded together. Bond strength can be measured by methods such as ASTM D-1876 or ASTM F-904.

Figure 1:
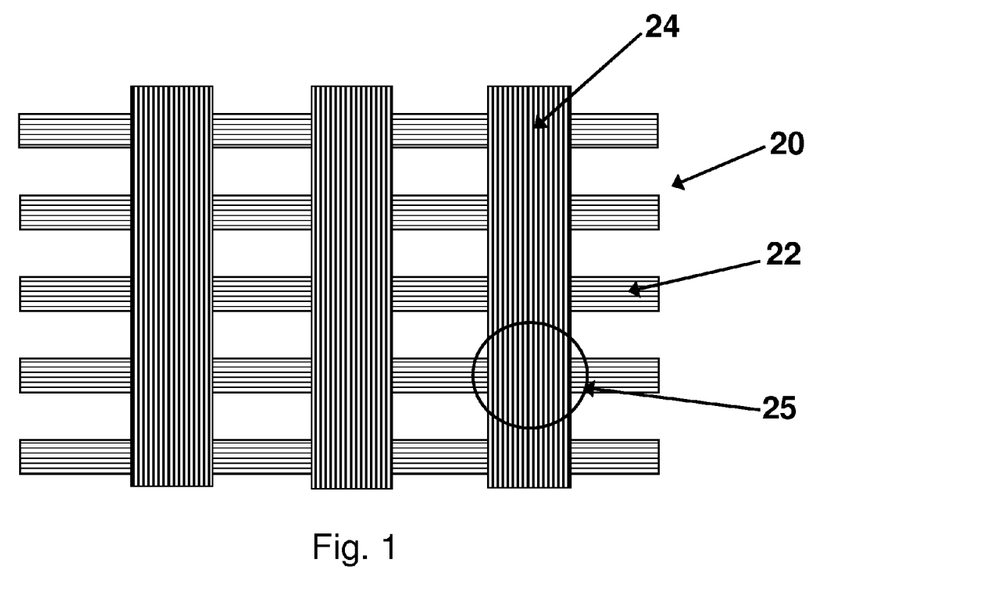
FIG. 1 shows a plan view of an open net-like fabric with strands of varying thicknesses used in the invention.

The moisture-resistant materials according to the invention comprise a layer of an open net-like fabric comprising strands of varying thickness (i.e. thin and thick strands) and an impermeable polymer film thereon. In one embodiment, the open fabric comprising strands of varying thickness is a net-like fabric formed of one or more polyolefins, for example polyethylene, polypropylene, or combinations thereof. In a specific embodiment, the fabric comprises thicker strands running in the machine direction (MD) of the fabric, and thinner strands running in the cross direction (CD) of the fabric. FIG. 1 illustrates a typical net-like fabric 20 comprising thin and thick strands. The fabric is formed of thin strands 22 which, in this embodiment, lie in the CD and thick strands 24 which, in this embodiment, lie in the MD. In another embodiment, the thin strands 22 might lie in the MD and the thick strands 24 might lie in the CD. The strands are thermally or adhesively bonded at the crossover points 25 to form a strong and stable net-like fabric. Such netting materials are commercially available from Conwed Plastics, Inc., Minneapolis, Minn. These netting materials and similar materials from other sources are available in a number of grades having varying combinations of physical properties which are suitable for use in the invention.

The thick and thin strands of the open net-like fabric 20 may comprise any natural or synthetic fiber-forming material. For instance, the strands may be made from cellulosic fibers such as cotton, hemp, linen, or rayon, or from protein-based fibers such as wool or silk. The strands may also comprise synthetic polymeric materials. Suitable polymers for the strands include any thermoplastic polymer or blends of such polymers which may be extruded into a fiber. Such polymers include, but are not limited to, polyolefins, polyesters, polyamides, thermoplastic polyurethanes, styrene block copolymers, polyvinyl chloride, and copolymers of these polymers. Preferred polymer compositions for the present invention include, but are not limited to, polyethylene and copolymers of polyethylene, polypropylene and copolymers of polypropylene, polyamides such as nylon 6,6 and copolymers of polyamides, and polyesters such as polyethylene terephthalate and other copolymers of polyesters.

The polymer compositions of the strands may also include polymer blends or heterogeneous polymer mixtures. For instance, the strands may comprise bicomponent structures such as sheath/core, side-by-side, islands-in-the-sea, and other known bicomponent configurations. In one example, one plurality of strands may comprise bicomponent materials, such as polyethylene sheath/polyester core fibers. In addition, the strands of the net-like fabric may be made of one or more materials; for instance, the thick strands of the fabric may comprise a polyester while the thin strands may comprise a polyolefin copolymer. Further embodiments will be apparent to one of ordinary skill in the art.

The moisture-resistant material of the present invention also includes an impermeable layer comprising a polymeric film. The polymer film must resist the penetration of liquid water; however, the film may be impervious to the passage of water vapor ('unbreathable film') or may allow water vapor to pass through ('breathable film'). If the film is breathable, it may comprise a monolithic polymeric material or a microporous polymeric material. A monolithic polymer film allows the absorption and passage of water vapor because of the polymer's hydrophilic character. A microporous film comprises a polymer composition blended with a filler, which is then stretched to form micropores as described more fully below. The micropores allow the passage of water vapor through a plurality of tortuous paths which connect the micropores through the thickness of the polymer film.

Figure 2:
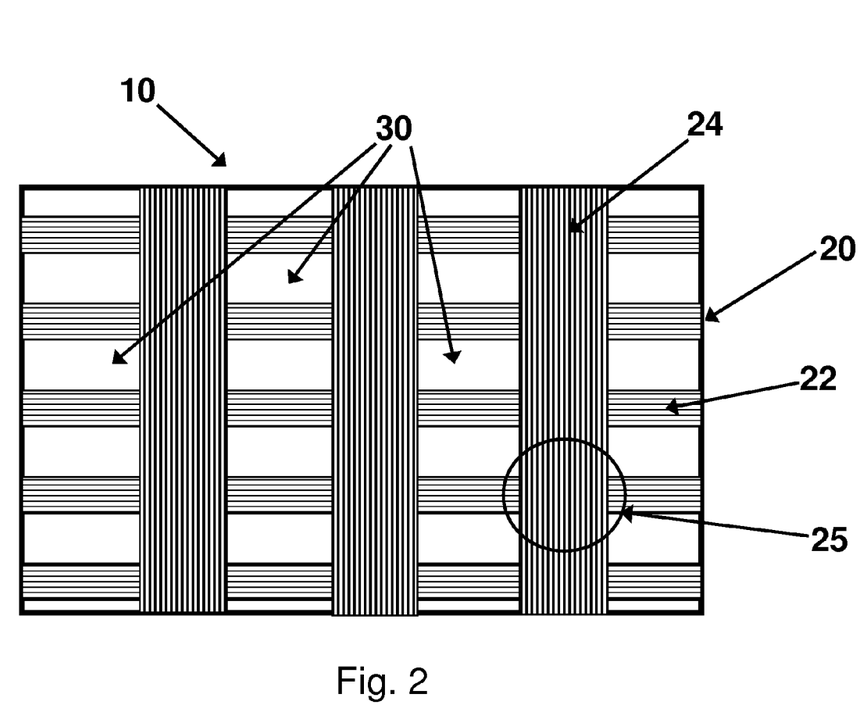
FIG. 2 shows a plan view of a laminate of an impermeable polymer film and an open net-like fabric with strands of varying thicknesses used in an embodiment of the invention.

FIG. 2 illustrates the open net-like fabric 20, comprising thin strands 22 and thick strands 24, which is bonded to an impermeable film layer 30 to form the moisture-resistant material 10 of the present invention. The impermeable film 30 comprises a polymer composition. Suitable polymers for the polymer composition of the impermeable film include any thermoplastic polymers or blends of such polymers which may be extruded into a film. Such polymers include, but are not limited to, polyolefins, polyesters, polyamides, thermoplastic polyurethanes, polyvinyl chloride, styrenic block copolymers, and copolymers of these polymers. Preferred polymer compositions for the present invention include, but are not limited to, polyethylene and copolymers of polyethylene, polypropylene and copolymers of polypropylene, polyamides and copolymers of polyamides, and polyesters and copolymers of polyesters. The polymer composition may also include polymer blends.

The impermeable film layer 30 of the present invention may comprise a breathable monolithic film. Suitable polymers for the polymer composition of the breathable monolithic film include any hydrophilic thermoplastic polymers or blends of such polymers which may be extruded into a film. Such polymers include, but are not limited to, hydrophilic polyesters, polyethers, polyamides, thermoplastic polyurethanes, and copolymers of these polymers.

The impermeable film layer 30 of the present invention may also comprise a breathable microporous polymer film. Such a microporous film composition will comprise a polymer composition and filler. Suitable fillers for a breathable film include, but are not limited to, various organic and/or inorganic materials. In a specific embodiment, the filler may comprise one or more inorganic materials such as metal oxides, metal hydroxides, metal carbonates and the like. Preferred fillers include, but are not limited to, calcium carbonate, barium sulfate, talc, diatomaceous earth, titanium dioxide, and mixtures thereof. The particle size of the filler may be selected in order to influence the micropore size in the film and consequently the breathability of the material product. Typically, filler having an average particle size of from about 0.5 to about 5 microns is suitable, although fillers of smaller or larger size may also be employed. The filler may optionally include a surface coating to facilitate dispersion of the filler in the polymer composition, to increase the ability of the filler to repel water, and/or to enhance the formation of micropores around the filler. The filler is included in the microporous film in an amount suitable to provide the desired breathability. Generally, the filler may be employed in an amount of from about 25 to about 75 weight percent of the total weight of the microporous film.

The impermeable film layer 30 may be formed as one layer or as multiple layers that are bonded to the open net-like fabric 20. In one embodiment, the film comprises a single layer film which may be formed on the fabric by an extrusion process. In another embodiment, the film comprises a multiple (two or more) layer film formed, for example, by coextrusion of two or more film layers where each layer comprises a different polymer film composition. In another embodiment, the film comprises a three-layer film formed by coextrusion of a core layer, comprising one polymer composition, and two outer layers, comprising another polymer composition. For example, the core layer may comprise polypropylene, while the outer layers comprise polyethylene. In another embodiment, the core and outer layers may comprise the same polymer blended with different amounts of other components, such as a filler. For example, the core layer may comprise polypropylene blended with 40% filler by weight, and the skin layers may comprise polypropylene blended with 50% filler by weight.

Figure 3:
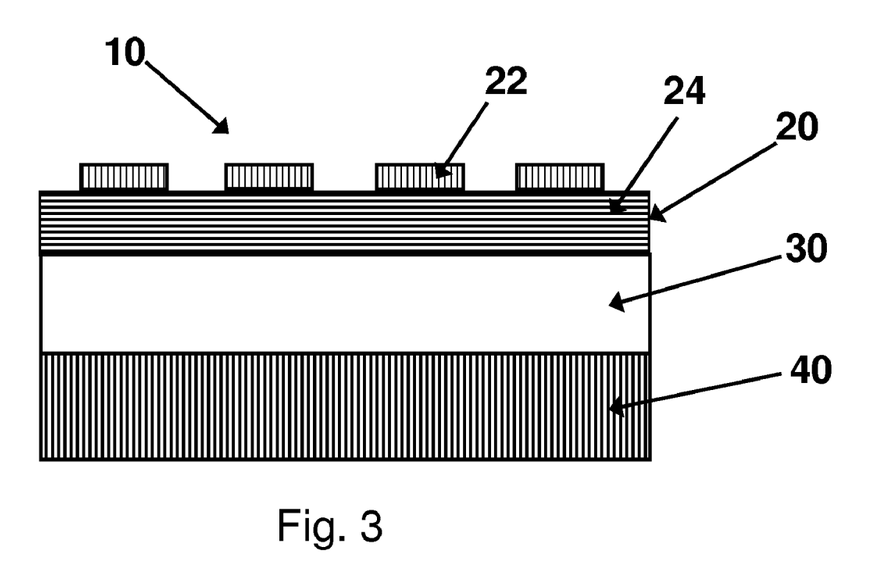
FIG. 3 shows a cross section view of a laminate comprising: a first layer of open net-like fabric with strands of varying thicknesses; a second layer of an impermeable polymer film; and a third layer of sheet-like material used in another embodiment of the invention.

The moisture-resistant B&C materials according to the invention may further comprise a second fabric layer, as illustrated in FIG. 3, wherein the impermeable polymer film 30 is layered between the first open net-like fabric layer 20 and a second fabric layer 40. The second fabric layer 40 may comprise a woven fabric, a nonwoven fabric, a scrim, netting, a woven tape material, or other similar materials. The second fabric layer 40 is present to provide additional strength and tear resistance to the moisture-resistant material 10, and also to protect the impermeable polymer film layer 30 from damage due to scuffing or abrasion.

In one embodiment, the second fabric layer 40 is a nonwoven fabric comprising randomly-laid spunbonded fibers, for example a spunbonded polyolefin such as polyethylene, polypropylene, or combinations thereof. Suitable spunbonded nonwovens may have a basis weight greater than about 0.7 oz/yd$^2$. In another embodiment, the fabric is a nonwoven fabric comprising spunbonded polypropylene having a basis weight equal to or greater than about 1 oz/yd$^2$. More specifically, the fabric is a nonwoven fabric comprising spunbonded polypropylene having a basis weight of greater than about 1.5 oz/yd$^2$. Suitable nonwoven fabrics may have fiber deniers of from about 2 to about 15, more specifically from about 10 to about 12, with fiber deniers at the higher end of this range being preferred in applications requiring toughness and strength such as B&C materials. Such spunbonded nonwovens are known in the art and are commercially available, for example, from Reemay, Inc. under the trade name TYPAR®.

In another embodiment, the second fabric layer 40 is a nonwoven fabric comprising a polyolefin cross-laminated open mesh. In a more specific embodiment, the fabric is a nonwoven fabric comprising polyethylene cross-laminated open mesh. Such fabrics are commercially available from Atlanta Nisseki CLAF, Inc. under the trade name CLAF®. The CLAF® fabrics are available in a number of grades having varying combinations of physical properties which are suitable for use in the invention. In one embodiment, the fabric is a nonwoven fabric comprising polyethylene cross-laminated open mesh having a basis weight of greater than about 0.7 oz/yd$^2$.

In another embodiment, the second fabric layer 40 is a nonwoven layer comprising a flash spun nonwoven material such as a flash spun high density polyethylene nonwoven material commercially available from DuPont under the trade name TYVEK®. The flash spun nonwoven materials are available in a range of basis weights and are suitable for use in the moisture-resistant materials of the invention. In certain embodiments, the flash spun nonwoven materials will have a basis weight in a range of from about 0.7 to about 4 oz/yd$^2$.

In another embodiment, the second fabric layer 40 comprises polyolefin tapes woven into a fabric. Such materials are commercially available from Propex Fabrics, Inc., Austell, Ga., under the trade name PROPEX®. The PROPEX® fabrics and similar materials from other sources are available in a number of grades having varying combinations of physical properties which are suitable for use in the invention. For example, the woven tape fabric may comprise polypropylene or polyethylene tapes woven into a fabric having a basis weight of greater than about 0.5 oz/yd$^2$.

Figure 4:
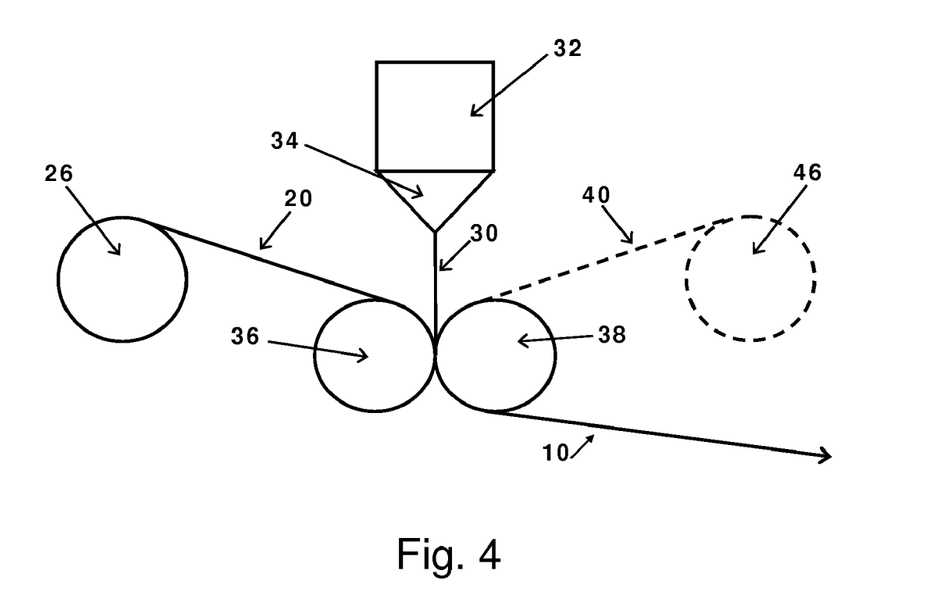
FIG. 4 shows a diagram of a typical extrusion coating process used in one embodiment of the invention.

In one embodiment of the present invention, the moisture-resistant material 10 is manufactured by extrusion coating the open net-like fabric 20 with a polymer film composition to form an impermeable polymer film 30 on the fabric. In another embodiment of the present invention, the moisture-resistant material 10 is manufactured by extrusion coating a polymer film composition onto the open net-like fabric 20 and the second fabric layer 40 to form an impermeable polymer film 30 between the fabric layers. For example, using techniques well known in the art and as illustrated in FIG. 4, a polymer film composition 30 may be extruded from an extruder 32 through a die 34 into a nip formed between rolls 36 and 38. The polymer film composition 30 is extruded at or above the melt temperature of the polymer component(s) of the film, typically around 300-500° F. Conventionally, the nip is formed between a metal roll and a rubber roll. The open net-like fabric layer 20 is supplied from a roll 26, and the extruded film 30 and the open net-like fabric 20 are passed through the nip of the rolls 36 and 38 to adhere the film 30 to the surface of the fabric 20. A second fabric layer 40 may optionally be supplied from a roll 46, and the second fabric 40 is also passed through the nip of the rolls 36 and 38 on the other side of the extruded film 30. This extrusion coating of layers 20, 30, and optional layer 40 forms the moisture-resistant laminated material 10. The moisture-resistant laminated material 10 may then undergo further processing, such as winding, slitting, aperturing, etc. For instance, if the polymer film 30 comprises a polymer and a filler capable of forming a microporous breathable film, the moisture-resistant material 10 may be stretched to render the polymer film 30 microporous. For instance, the moisture-resistant material 10 may be stretched by an incremental stretching technique taught in U.S. Pat. No. 5,865,926 to render the polymer film 30 microporous.

Figure 5:
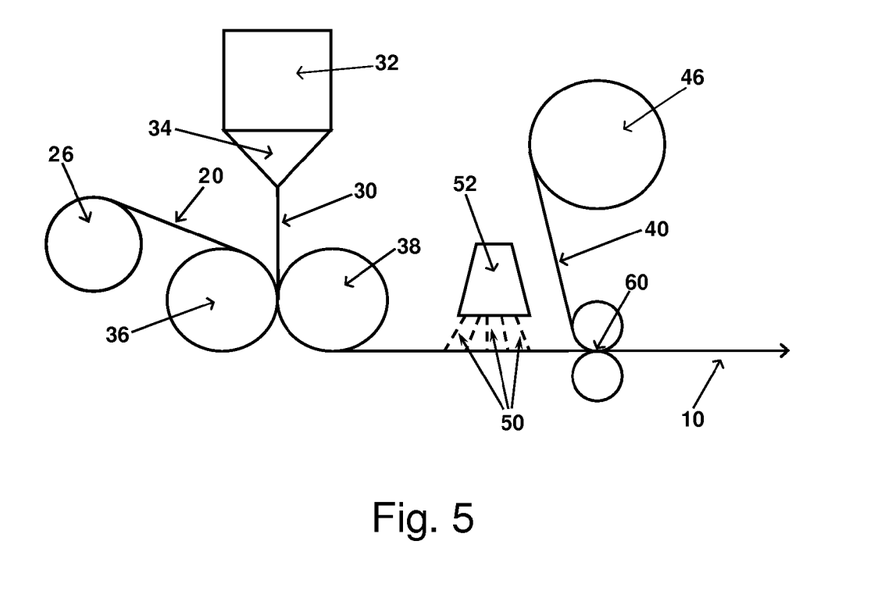
FIG. 5 shows a diagram of a typical adhesive lamination process used in one embodiment of the invention.

In yet another embodiment of the present invention, the moisture-resistant material 10 is manufactured by extrusion coating a polymer film composition 30 onto the open net-like fabric 20, and an optional second fabric layer 40 is adhesively laminated to the other side of the impermeable polymer film 30. For example, using techniques well known in the art and as illustrated in FIG. 5, a polymer film composition 30 may be extruded from an extruder 32 through a die 34 into a nip formed between rolls 36 and 38. The polymer film composition 30 is extruded at or above the melt temperature of the polymer component(s) of the film, typically around 300-500° F. Conventionally, the nip is formed between a metal roll and a rubber roll. The open net-like fabric layer 20 is supplied from a roll 26, and the extruded film 30 and the open net-like fabric 20 are passed through the nip of the rolls 36 and 38 to adhere the film 30 to the surface of the fabric 20 to form a two-layer moisture resistant material 12. This material 12 is then optionally treated with adhesive 50 from an application device 52. The application device 52 may be any typical device for applying adhesives, such as a spray unit, a coater, or an extruder. An optional second fabric layer 40 may be supplied from a roll 46, and the second fabric 40 is attached to the material 12 by pressing the fabric 40 into the adhesive 50 at a roll nip 60, to form the moisture-resistant laminated material 10. The moisture-resistant laminated material 10 may then undergo further processing, such as winding, slitting, aperturing, etc. For instance, if the polymer film 30 comprises a polymer and a filler capable of forming a microporous breathable film, the moisture-resistant material 10 may be stretched to render the polymer film 30 microporous. For instance, the moisture-resistant material 10 may be stretched by an incremental stretching technique taught in U.S. Pat. No. 5,865,926 to render the polymer film 30 microporous.

The breathability of the materials according to the invention may be controlled as desired for the intended application of the materials. When used for certain B&C materials, such as roofing underlayment, the breathability of the material is not specified in building codes. For other B&C materials, such as housewrap, the materials suitably have a water vapor transmission rate (WVTR) of greater than about 70 g/m$^2$·24 hr, more specifically greater than about 150 g/m$^2$·24 hr, and even more specifically greater than about 300 g/m$^2$·24 hr, as measured according to ASTM E-96A. Typically, B&C materials do not require high WVTRs and will often have a WVTR of less than about 2000 g/m$^2$·24 hr. It is understood however that materials having higher WVTRs are equally within the scope of the invention.

For B&C materials, it is often desirable that the material is formed of components which are relatively strong and tough. For example, in selected embodiments, the fabric layer or layers present in the moisture-resistant material 10 may exhibit a tensile strength of at least about 20 lb/in as measured according to ASTM D-882.

Another important property of B&C materials is their resistance to impinging liquids such as water. Water resistance can be measured by testing the hydrohead of the material by a method such as AATCC 127. For these materials used in the B&C industries, a hydrohead greater than 55 cm by the AATCC 127 test is usually acceptable.

Yet another important property of B&C materials is slip resistance, in particular, slip resistance when the material is wet. Slip resistance may be measured by testing the coefficient of friction (COF) of a material by several test methods. However, within the B&C industry, there is no standard method and no consensus on proper test methods or target test results for slip resistance of B&C materials. The inventors have developed a modified COF test method, discussed below, to test the inventive material and comparative materials.

Modified Coefficient of Friction Test

Figure 6:
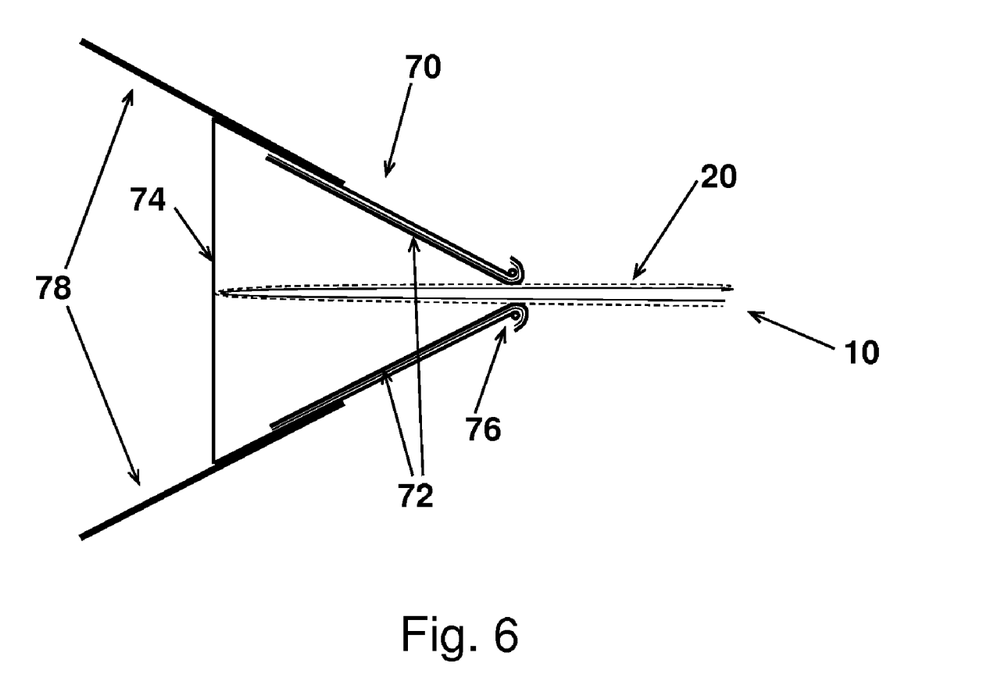
FIG. 6 shows a diagram of the test apparatus designed to hold a sample for the modified coefficient of friction (COF) test developed by the inventors to simulate the slip experienced by a person wearing polyurethane-soled boots.

The inventors have devised a modified COF test to reproduce the slippage that a roofer might experience on the edge of his or her boot. The test apparatus is illustrated in FIG. 6. For this test, a polyurethane (PU) coated fabric 72 is used that mimics the PU sole of a boot. The PU-coated fabric 72 is then bonded securely to the inside surfaces, including the gripping zone 76, of a large binder clip 70, such as a large Universal Binder Clip from Stationers Supply Company, Des Plaines, Ill. The PU-coated fabric 72 is secured to both inner surfaces of the binder clip 70 with the PU coating facing outward.

A sample of the material 10 to be tested is cut into a strip that is 1 inch×6 inch, with the long dimension of the strip parallel to the sample direction (CD or MD) to be tested. The test sample 10 is then folded approximately in half to make a rectangle that is roughly 1 inch×3 inch, with the open net-like fabric 20 surface facing outward and the strands of the open net-like fabric on the outer surfaces aligned on both sides of the folded sample. The folded test sample 10 is inserted into the prepared binder clip so that the folded edge of the sample rests against the inner surface of the rear wall 74 of the clip and the open fabric surfaces of the test sample 10 are gripped by the PU-coated gripping zone 76 of the clip.

Figure 7:
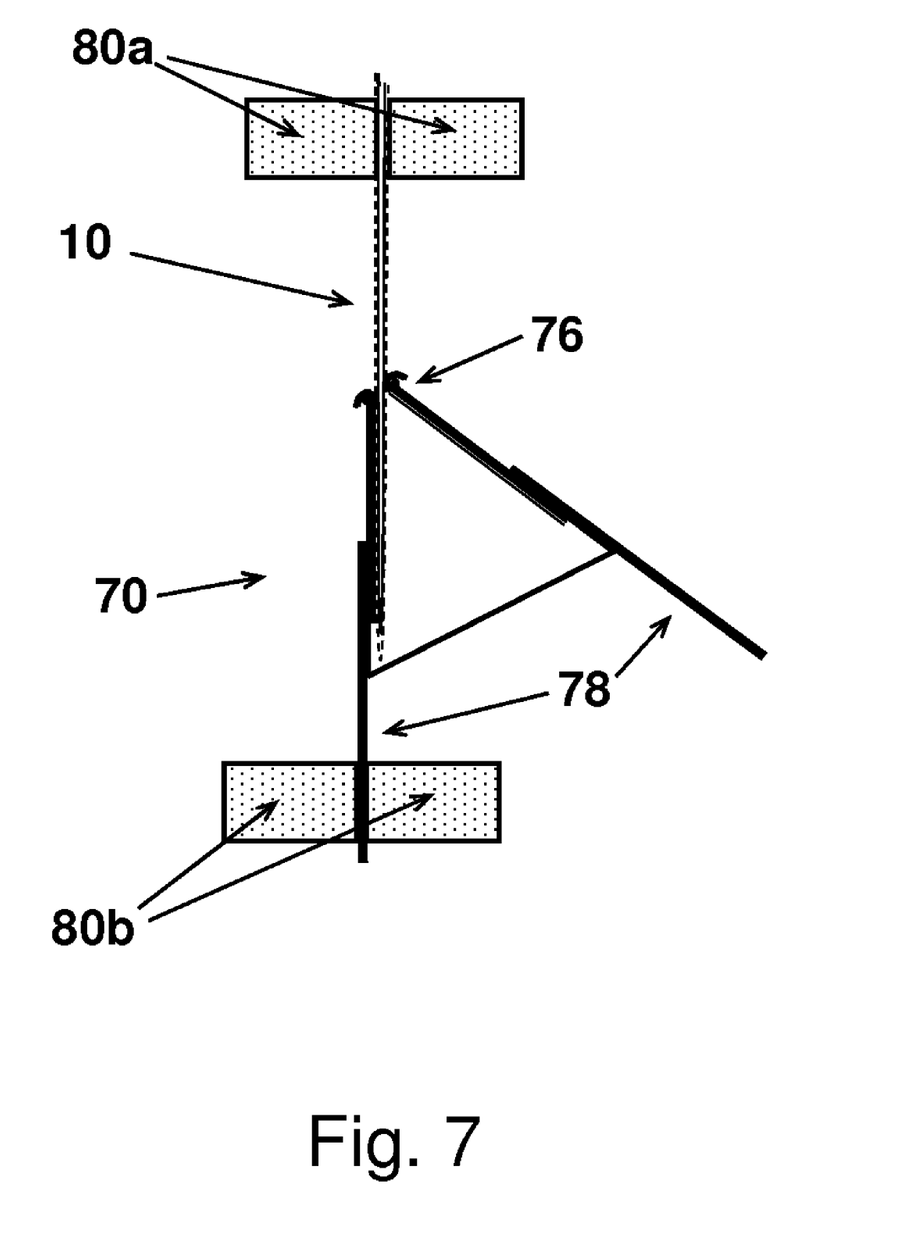
FIG. 7 shows a diagram of a sample being tested by the modified coefficient of friction (COF) test developed by the inventors.

The modified COF test is measured on an MTS QTest® 1L from MTS Systems Corporation, Eden Prairie, Minn., or similar universal testing machine. As illustrated in FIG. 7, the free ends of the test sample 10 are mounted in the moving grip 80a of the testing machine with the long axis of the sample parallel to the pull direction of the machine. One handle 78 of the binder clip 70 holding the sample 10 is mounted into the stationary grip 80b of the testing machine. The testing machine is then used to pull the test sample 10 out of the PU-coated gripping zone 76 of the binder clip 70 at a pulling speed of 20 in/min, and the machine measures the force required to pull the sample through the gripping zone.

In one embodiment, the multilayer materials according to the invention have a dry-surface slip resistance of at least about 1000 grams force (gf), more specifically at least about 1100 gf, and/or a wet-surface slip resistance of at least about 1200 gf, more specifically at least about 1300 gf, as measured by the modified coefficient of friction test, as described above and as referred to in this specification as such.

The following example is intended to illustrate the present invention. This example, however, does not limit the scope of the present invention.

EXAMPLE

This example demonstrates a moisture-resistant material 10 comprising a microporous film 30 extrusion-bonded to an open net-like fabric 20 and a spunbond polypropylene (SBPP) fabric 40. The open net-like fabric 20 used was Conwed 810348 netting, comprising polypropylene fibers in a 4×16 fibers per inch (MD×CD) mesh, with the thick fibers running in the MD and the thin fibers running in the CD. The thick fibers have a diameter of about 15 mil and the thin fibers have a diameter of about 10 mil. The SBPP fabric layer 40 was a 68 gsm SBPP nonwoven from Polymer Group, Inc., Charlotte, N.C. The microporous film 30 is a coextruded ABA multilayer film. The total film basis weight was approximately 40 gsm, with the ABA layers comprising approximately 25:50:25 percent of the total film composition. The coextruded polymer film layers comprise the following components:

A layers: 53% calcium carbonate, 41% linear-low density polyethylene, 4% titanium dioxide, 1% CaO masterbatch, and 1% processing aid.

B layer: 55% calcium carbonate, 37% homopolymer polypropylene resin, 5% low density polyethylene resin, 3% titanium dioxide masterbatch and 1% CaO masterbatch.

The moisture-resistant material 10 was manufactured by extrusion laminating the ABA multilayer film 30 to both the open net-like fabric 20 and the second SBPP fabric layer 40 as illustrated in FIG. 4. After the moisture-resistant material 10 was formed, the material 10 was incrementally stretched, by the method described in U.S. Pat. No. 5,865,926, to render the polymer film layer 30 microporous.

The resulting microporous, moisture-resistant material 10 was tested for various material properties. The test results are given in Table 1. This exemplary moisture-resistant material has acceptable hydrohead, tensile, and WVTR properties for many B&C materials.

TABLE 1

| Example Material Properties | | | |
| --- | --- | --- | --- |
| Property | Test Method | Result | Std Dev |
| Hydrohead | AATCC 127 | 178.5 cm | 17.7 |
| Ultimate Tensile (MD) | ASTM D-882 | 20.1 lb/in | 2.1 |
| Ultimate Tensile (CD) | ASTM D-882 | 27.6 lb/in | 1.3 |
| Water Vapor Transmission Rate | ASTM E96A | 180 g/m$^2$*24 hr | 16.7 |

This moisture-resistant material 10 was tested using the inventors' modified COF test. For comparison, a sample of TITANIUM-UDL™ synthetic roofing underpayment, from InterWrap, Mission, British Columbia, Canada, was also tested. The samples were tested with either dry or wet test surfaces. The results are given in Table 2. The exemplary moisture-resistant material of this invention has higher COF values for both dry and wet samples, which indicates the inventive material will be more slip-resistant than the comparative example.

TABLE 2

| Modified COF Test | | |
| --- | --- | --- |
| Test Sample | Dry Sample Result | Wet Sample Result |
| Example | 1420 gf | 1718 gf |
| TITANIUM-UDL ™ (comparative example) | 900 gf | 1180 gf |

The specific illustrations and embodiments described herein are exemplary only in nature and are not intended to be limiting of the invention defined by the claims. Further embodiments and examples will be apparent to one of ordinary skill in the art in view of this specification and are within the scope of the claimed invention.

What is claimed is:

1. A multilayer material comprising:
a) an open net-like fabric layer comprising
   i) a first plurality of strands laid roughly parallel to one another and spaced apart in a first direction, where the first plurality of strands are thick strands, and
   ii) a second plurality of strands that are laid roughly parallel to one another and spaced apart in a second direction across the first plurality of strands, where the second direction is different from the first direction, and where the second plurality of strands are thin strands,
   wherein the first plurality of strands and the second plurality of strands are affixed to one another such that the open net-like fabric layer comprises a first surface and a second surface;
b) a polymer film layer having a first surface and a second surface; and
c) a third sheet-like substrate having a first surface and a second surface, wherein the third sheet-like substrate comprises nonwoven fabric, woven fabric, scrim, netting, woven tape material, flash-spun material, or a combination thereof; wherein the first surface of the open net-like fabric layer and the first surface of the polymer film layer are bonded together coextensively; wherein the first surface of the third sheet-like substrate is bonded coextensively across the second surface of the polymer film layer; and wherein the resulting multilayer material has a dry-surface slip resistance of at least about 1000 gf or a wet-surface slip resistance of at least about 1200 gf, as measured by the modified coefficient of friction test.

2. A multilayer material according to claim 1, wherein the thick strands of the open net-like fabric layer run in the machine direction.

3. A multilayer material according to claim 1, wherein the thick strands of the open net-like fabric layer run in the cross direction.

4. A multilayer material according to claim 1, wherein the thick strands of the open net-like fabric layer run at an angle relative to the machine direction.

5. A multilayer material according to claim 1, wherein the strands of the open net-like fabric layer comprise a material selected from the group consisting of cotton, linen, wool, flax, silk, hemp, and combinations thereof.

6. A multilayer material according to claim 1, wherein the strands of the open net-like fabric layer comprise a material selected from the group consisting of polyolefins, polyamides, polyesters, polyacrylates, styrenic copolymers, polyurethanes, rayon, and combinations thereof.

7. A multilayer material according to claim 6, wherein the strands of the open net-like fabric layer comprise a material selected from the group consisting of polyethylene, copolymers of polyethylene, polypropylene, copolymers of polypropylene, polyester, copolymers of polyesters, polyamides, copolymers of polyamides, blends thereof, bicomponent combinations thereof, and other heterogeneous combinations thereof.

8. A multilayer material according to claim 1, wherein the thick strands of the open net-like fabric layer comprise strands that have an average diameter of at least about 10 mil (0.25 mm).

9. A multilayer material according to claim 1, wherein the polymer film layer comprises a thermoplastic polymer that can be extruded into a film.

10. A multilayer material according to claim 9, wherein the polymer film layer comprises a thermoplastic polymer selected from the group consisting of polyolefins, polyesters, polyamides, thermoplastic polyurethanes, polyvinyl chloride, styrenic block copolymers, copolymers thereof, and combinations thereof.

11. A multilayer material according to claim 1, wherein the polymer film layer comprises a film with a WVTR greater than about 70 g/m$^2$·24 hr.

12. A multilayer material according to claim 11, wherein the polymer film layer comprises a monolithic film.

13. A multilayer material according to claim 11, wherein the polymer film layer comprises a microporous film.

14. A multilayer material according to claim 13, wherein the polymer film layer comprises a filler.

15. A multilayer material according to claim 14, wherein the polymer film layer comprises a filler selected from the group consisting of calcium carbonate, barium sulfate, talc, diatomaceous earth, titanium dioxide, and mixtures thereof.

16. A multilayer material according to claim 1, wherein the polymer film layer is a multilayer film.

17. A multilayer material according to claim 1, wherein the open net-like fabric layer and the polymer film layer are bonded coextensively across their first surfaces by extrusion lamination.

18. A multilayer material according to claim 1, wherein the open net-like fabric layer and the polymer film layer are bonded coextensively across their first surfaces by adhesive, thermal, ultrasonic, or calender lamination.

19. A multilayer material according to claim 1, wherein the third sheet-like substrate is bonded to the second surface of the polymer film layer by extrusion, adhesive, ultrasonic, thermal, or calender lamination.

20. A multilayer material comprising:
  a) an open net-like fabric layer comprising
    i) a first plurality of thick strands that run roughly parallel to one another and are spaced apart in the machine direction, and
    ii) a second plurality of thin strands that run roughly parallel to one another and are spaced apart in the cross direction across the first plurality of strands,
  wherein the first plurality of strands and the second plurality of strands are affixed to one another such that the open net-like fabric layer comprises a first surface and a second surface; and
  b) a polymer film layer having a first surface and a second surface; and
  c) a third sheet-like substrate having a first surface and a second surface, wherein the third sheet-like substrate comprises nonwoven fabric, woven fabric, scrim, netting, woven tape material, flash-spun material, or a combination thereof;
  wherein the first surface of the open net-like fabric layer and the first surface of the polymer film layer are bonded together coextensively, and the first surface of the third sheet-like substrate is bonded together coextensively to the second surface of the polymer film layer; and
  wherein the resulting multilayer material has a dry-surface slip resistance of at least about 1000 gf or a wet-surface slip resistance of at least about 1200 gf, as measured by the modified coefficient of friction test.

21. A multilayer material according to claim 20, wherein the strands of the open net-like fabric layer comprise a material selected from the group consisting of cotton, linen, wool, flax, silk, hemp, and combinations thereof.

22. A multilayer material according to claim 20, wherein the strands of the open net-like fabric layer comprise a material selected from the group consisting of polyolefins, polyamides, polyesters, polyacrylates, styrenic copolymers, polyurethanes, rayon, and combinations thereof.

23. A multilayer material according to claim 22, wherein the strands of the open net-like fabric layer comprise a material selected from the group consisting of polyethylene, copolymers of polyethylene, polypropylene, copolymers of polypropylene, polyester, copolymers of polyesters, polyamides, copolymers of polyamides, blends thereof, bicomponent combinations thereof, and other heterogeneous combinations thereof.

24. A multilayer material according to claim 20, wherein the thick strands of the open net-like fabric layer comprise strands that have an average diameter of at least about 10 mil (0.25 mm).

25. A multilayer material according to claim 20, wherein the polymer film layer comprises a thermoplastic polymer selected from the group consisting of polyolefins, polyesters, polyamides, thermoplastic polyurethanes, polyvinyl chloride, styrenic block copolymers, copolymers thereof, and combinations thereof.

26. A multilayer material according to claim 20, wherein the polymer film layer comprises a film with a WVTR greater than about 70 g/m$^2$·24 hr.

27. A multilayer material according to claim 26, wherein the polymer film layer comprises a monolithic film.

28. A multilayer material according to claim 26, wherein the polymer film layer comprises a microporous film.

29. A multilayer material according to claim 28, wherein the polymer film layer comprises a filler selected from the group consisting of calcium carbonate, barium sulfate, talc, diatomaceous earth, titanium dioxide, and mixtures thereof.

30. A multilayer material according to claim 20, wherein the polymer film layer is a multilayer film.

31. A multilayer material according to claim 20, wherein the open net-like fabric layer and the polymer film layer are bonded coextensively across their first surfaces by extrusion lamination.

32. A multilayer material according to claim 20, wherein the open net-like fabric layer and the polymer film layer are bonded coextensively across their first surfaces by adhesive, thermal, ultrasonic, or calender lamination.

33. A multilayer material according to claim 20, wherein the third sheet-like substrate is bonded to the second surface of the polymer film layer by extrusion, adhesive, ultrasonic, thermal, or calender lamination.

34. A method of manufacturing a multilayer material comprising an open net-like fabric, a polymer film layer, and a third sheet-like substrate comprising:
   a) providing an open net-like fabric layer comprising
      i) a first plurality of strands laid roughly parallel to one another and spaced apart in a first direction, where the first plurality of strands are thick strands, and
      ii) a second plurality of strands that are laid roughly parallel to one another and spaced apart in a second direction across the first plurality of strands, where the second direction is different from the first direction, and where the second plurality of strands are thin strands,
      wherein the first plurality of strands and the second plurality of strands are affixed to one another such that the open net-like fabric layer comprises a first surface and a second surface;
   b) providing a polymer film layer having a first surface and a second surface;
   c) providing a third sheet-like substrate having a first surface and a second surface, wherein the third sheet-like substrate comprises nonwoven fabric, woven fabric, scrim, netting, woven tape material, flash-spun material, or a combination thereof;
   d) bonding the first surface of the open net-like fabric layer and the first surface of the polymer film layer coextensively; and
   e) bonding the first surface of the third sheet-like substrate and the second surface of the polymer film layer coextensively;
   wherein the resulting multilayer material has a dry-surface slip resistance of at least about 1000 gf or a wet-surface slip resistance of at least about 1200 gf, as measured by the modified coefficient of friction test.

35. A method according to claim 34, wherein the thick strands of the open net-like fabric layer run in the machine direction.

36. A method according to claim 34, wherein the thick strands of the open net-like fabric layer run in the cross direction.

37. A method according to claim 34, wherein the thick strands of the open net-like fabric layer run at an angle relative to the machine direction.

38. A method according to claim 34, wherein the strands of the open net-like fabric layer comprise a material selected from the group consisting of cotton, linen, wool, flax, silk, hemp, and combinations thereof.

39. A method according to claim 34, wherein the strands of the open net-like fabric layer comprise a material selected from the group consisting of polyolefins, polyamides, polyesters, polyacrylates, styrene block copolymers, polyurethanes, rayon, and combinations thereof.

40. A method according to claim 39, wherein the strands of the open net-like fabric layer comprise a material selected from the group consisting of polyethylene, copolymers of polyethylene, polypropylene, copolymers of polypropylene, polyester, copolymers of polyesters, polyamides, copolymers of polyamides, blends thereof, bicomponent combinations thereof, and other heterogeneous combinations thereof.

41. A method according to claim 34, wherein the thick strands of the open net-like fabric layer comprise strands that have an average diameter of at least about 10 mil (0.25 mm).

42. A method according to claim 34, wherein the polymer film layer comprises a thermoplastic polymer that can be extruded into a film.

43. A method according to claim 42, wherein the polymer film layer comprises a thermoplastic polymer selected from the group consisting of polyolefins, polyesters, polyamides, thermoplastic polyurethanes, polyvinyl chloride, styrenic block copolymers, copolymers thereof, and combinations thereof.

44. A method according to claim 34, wherein the polymer film layer comprises a film with a WVTR greater than about 70 $g/m^2 \cdot 24$ hr.

45. A method according to claim 44, wherein the polymer film layer comprises a monolithic film.

46. A method according to claim 44, wherein the polymer film layer comprises a microporous film.

47. A method according to claim 46, wherein the polymer film layer comprises a filler.

48. A method according to claim 47, wherein the polymer film layer comprises a filler selected from the group consisting of calcium carbonate, barium sulfate, talc, diatomaceous earth, titanium dioxide, and mixtures thereof.

49. A method according to claim 34, wherein the polymer film layer is a multilayer film.

50. A method according to claim 34, wherein the polymer film layer is extruded onto the open net-like fabric layer to bond the polymer film layer and open net-like fabric layer coextensively across their first surfaces by extrusion lamination.

51. A method according to claim 34, wherein the open net-like fabric layer and the polymer film layer are bonded coextensively across their first surfaces by adhesive, thermal, ultrasonic, or calender lamination.

52. A method according to claim 34, wherein the third sheet-like substrate is bonded to the second surface of the polymer film layer by extrusion, adhesive, ultrasonic, thermal, or calender lamination.

53. A multilayer material consisting of:
   a) an open net-like fabric layer having
      i) a first plurality of strands laid roughly parallel to one another and spaced apart in a first direction, where the first plurality of strands are thick strands, and
      ii) a second plurality of strands that are laid roughly parallel to one another and spaced apart in a second direction across the first plurality of strands, where the second direction is different from the first direction, and where the second plurality of strands are thin strands,
      wherein the first plurality of strands and the second plurality of strands are affixed to one another such that the open net-like fabric layer has a first surface and a second surface;
   b) a polymer film layer having a first surface and a second surface; and
   c) a third sheet-like substrate having a first surface and a second surface, wherein the third sheet-like substrate is a nonwoven fabric, woven fabric, scrim, netting, woven tape material, flash-spun material, or a combination thereof; wherein the first surface of the open net-like fabric layer and the first surface of the polymer film layer are bonded together coextensively; and wherein the first surface of the third sheet-like substrate is bonded coextensively across the second surface of the polymer film layer;

and wherein the resulting multilayer material has a dry-surface slip resistance of at least about 1000 gf or a wet-surface slip resistance of at least about 1200 gf, as measured by the modified coefficient of friction test.

* * * * *